United States Patent
Itamiya et al.

(10) Patent No.: US 7,953,406 B2
(45) Date of Patent: May 31, 2011

(54) ACCESS POINT

(75) Inventors: Takashi Itamiya, Yokohama (JP); Tatsuo Horikoshi, Toyota (JP); Kuniaki Akatsuka, Yokohama (JP); Taketoshi Arakawa, Yokohama (JP); Shigeyuki Sudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 521 days.

(21) Appl. No.: 11/540,554

(22) Filed: Oct. 2, 2006

(65) Prior Publication Data
US 2007/0183379 A1 Aug. 9, 2007

(30) Foreign Application Priority Data

Feb. 3, 2006 (JP) ................................ 2006-026502

(51) Int. Cl.
*H04W 24/00* (2009.01)
(52) U.S. Cl. ..... 455/424; 455/423; 455/561; 455/562.1; 370/338
(58) Field of Classification Search ............ 455/423
See application file for complete search history.

(56) References Cited

U.S. PATENT DOCUMENTS

| | | | | |
|---|---|---|---|---|
| 6,088,588 A | * | 7/2000 | Osborne | 455/425 |
| 7,177,661 B2 | * | 2/2007 | Shpak | 455/524 |
| 7,366,508 B2 | | 4/2008 | Hasegawa et al. | |
| 7,809,379 B2 | | 10/2010 | Kim | |
| 2005/0107080 A1 | * | 5/2005 | Hasegawa et al. | 455/423 |

FOREIGN PATENT DOCUMENTS

| | | |
|---|---|---|
| JP | 10-173655 | 6/1998 |
| JP | 2000-138642 | 5/2000 |
| JP | 2003-046425 | 2/2003 |
| JP | 2003-509920 | 3/2003 |
| JP | 2005-136811 | 5/2005 |
| JP | 2005-151189 | 6/2005 |
| JP | 2006-0143317 | 1/2006 |

OTHER PUBLICATIONS

3rd Generation Partnership Project 2, Short Message Service, 3GPP2 C.S0015-0, Section 2.4.1.1.1.2.*

* cited by examiner

*Primary Examiner* — Charles N Appiah
*Assistant Examiner* — Mazda Sabouri
(74) *Attorney, Agent, or Firm* — Antonelli, Terry, Stout & Kraus, LLP.

(57) ABSTRACT

An access point diagnosis unit 201 controls a radio access terminal portion 213 included in the access point 100, to execute a test of connection with the access point 100. A switch within the access point selectively connects the radio access terminal portion 213, with any of an antenna and radio reception parts of the own access point 100. In accordance with a failing part, the failure information which contains the failing part and/or a failure content is transmitted from the radio access terminal portion 213 to the radio access terminal 108 (1) along a first path tracing the radio reception part connected by the switch, etc. of the access point 100, or (2) along a second path tracing the antenna connected by the switch and the other access point 101.

16 Claims, 13 Drawing Sheets

| IP ADDRESS | SUBSCRIBER ID |
|---|---|
| IP ADDRESS A | IMSI A |
| IP ADDRESS B | IMSI B |
| IP ADDRESS C | IMSI C |
| IP ADDRESS D | IMSI D |
| IP ADDRESS E | IMSI E |

FIG. 8

| SUBSCRIBER ID | SUBSCRIBER INFORMATION |
| --- | --- |
| IMSI A | SUBSCRIBER INFORMATION A |
| IMSI B | SUBSCRIBER INFORMATION B |
| IMSI C | SUBSCRIBER INFORMATION C |
| IMSI D | SUBSCRIBER INFORMATION D |
| IMSI E | SUBSCRIBER INFORMATION E |

FIG. 9

| SUBSCRIBER INFORMATION | ADDRESS INFORMATION OF PORTABLE ACCESS TERMINAL |
|---|---|
| SUBSCRIBER INFORMATION A | ADDRESS INFORMATION A |
| SUBSCRIBER INFORMATION B | ADDRESS INFORMATION B |
| SUBSCRIBER INFORMATION C | ADDRESS INFORMATION C |
| SUBSCRIBER INFORMATION D | ADDRESS INFORMATION D |
| SUBSCRIBER INFORMATION E | ADDRESS INFORMATION E |

FIG. 10

ACCESS POINT

BACKGROUND OF THE INVENTION

The present invention relates to an access point, and more particularly to an access point wherein the result of the detection of any failure of the radio access point, in other words, the failure of a radio access point diagnosis is notified to a specified portable access terminal.

Nowadays, regarding a radio communication system, the provision of a radio data communication service of large capacity based on an inexpensive fixed amount system has begun, and chances for performing radio communications have steadily increased. Besides, owing to the spread of such an inexpensive and highly valuable service, users who use portable access terminals represented by portable telephones are increasing more. In view of such a situation, enhancement in the stability of the radio communication system is one of very important problems. A manufacturer which provides the radio communication system endows the system with a redundant configuration or the like in order to enhance the stability of the service, and thus contrives so as not to stop the radio communication service, even in case of the occurrence of any failure.

For the purpose of attaining a further stability of the system in addition to such a contrivance, it is necessitated to build a system which can quickly cope with the case of the occurrence of the failure. The present-day system often has the redundant configuration as stated above, and even when any abnormality has occurred in one subsystem of the system, the system is changed-over to the other subsystem and is continued to operate, whereby the system does not lead to service shutdown. It is required, however, to resume the failing subsystem as promptly as possible and to return the system to an ordinary state. For this purpose, it is required to quickly obtain failure information.

There has been disclosed, for example, an access point diagnosis apparatus which decides whether or not the self-diagnosis of an access point is to be executed (refer to, for example, Patent Document 1). Also, there has been disclosed a test apparatus which performs an antenna failure test, a receiver failure test, etc. by employing an access terminal function unit included in an access point (refer to, for example, Patent Document 2).

Besides, there has been disclosed a method in a communication system as facilitates data transmission from a push service provider which subjects data to addressing by an Internet Protocol address, to a receiver which is specified within the communication system by a subscriber ID different from the IP address (refer to, for example, Patent Document 3).

[Patent Document 1] JP-A-2005-136811
[Patent Document 2] JP-A-2005-151189
[Patent Document 3] JP-T-2003-509920

The term "JP-T" as used herein means a published Japanese translation of a PCT patent application.

SUMMARY OF THE INVENTION

In a present-day system, means for obtaining the failure information of a radio access point is not available outside a maintenance center. When a system in which the failure information of the radio access point can be obtained even outside the maintenance center is built, it is permitted to obtain the failure information of the access point even outside, for example, the maintenance center.

Besides, according to a prior-art technique, a method for notifying a failure in the case where the failure has been detected by an access point diagnosis unit is such that the failure is notified to the maintenance center of the radio access point through a line which is connected to the radio access point by wire (refer to, for example, Patent Document 2). In the maintenance center, a failure recovery operation is performed on the basis of the failure information notified by the radio access point. In the case of the above notification method, it is presupposed that a line interface portion for connecting the radio access point and a network is operating normally. In a case, for example, where the line interface portion is unusable, the failure information cannot be notified. In case of considering the reliability of the system, the reliability of the wired line can be enhanced by a method such as dualizing the line interface portion, but this countermeasure is costly. Besides, in the worst case, it is supposed that both the dual line interface portions become unusable on account of any cause, so serious evil influence might be exerted on the continuation of service provision. In such a case, if the failure information of the access point can be notified without using an existing wired path, the failure can be notified in spite of the occurrence of any failure in the wired circuit, so the recovery of the system from the failure can be quickened. Besides, when a path along which the failure information of the access point can be obtained even in a place outside the maintenance center is established, a prompt and flexible maintenance can be executed without being limited to the specified place. Moreover, the notification of the failure information to outside the maintenance center is broadcast to many persons concerned with the maintenance of the access point, whereby the failure information can be shared to, bring forth the merit that the maintenance of the access point can be made multifarious.

In view of the above drawbacks, the invention has for its object to realize an access point in which, in case of the occurrence of any failure in the radio access point, failure information is notified, not only to a specified maintenance center connected by wire, but also to a specified portable access terminal or the like connectable by radio. Another object of the invention is to notify the failure information of a pertinent access point through an adjacent access point in such a way that, in a case where communications with a maintenance center by wire have been judged impossible on account of any failure of the pertinent radio access point, radio waves from the adjacent access point located nearby are caught. Still another object of the invention is to notify a failure without altering the configuration and execution method of an existing access point diagnosis.

The invention has for one of its objects to realize the above notification method without altering the diagnostic method of a known radio access point, and by remodeling the configuration of the radio access point on a small scale. Another object of the invention is to make a radio access terminal portion use an SMS (Short Message Service) which is a known technique or a known technique (refer to, for example, Patent Document 3) in which the International Mobile Subscriber Identity (IMSI) for use in the identification of a portable access terminal is translated into an IP address so as to transmit an IP packet to the specified IP address, whereby the portable access terminal of a notification destination is permitted to receive the notice of the failure information of the radio access point by the existing data communication technique. Especially the SMS is the known technique in a present-day radio communication system, and has the important merit that a traffic necessary for the transmission of a message is very small.

The invention has for one of its objects to realize a maintenance operation which enhances responsiveness more flexibly, in such a way that, even in a case where the maintenance engineer of a radio access point is not present in a maintenance center as in the prior art, failure information is notified to a specified portable access terminal carried by the maintenance engineer, whereupon the maintenance engineer remotely accesses a maintenance access terminal (PC) installed in, for example, the maintenance center. Another object of the invention is to set a plurality of portable access terminals to which failure information is notified, and to expand the failure information of identical content in the portable access terminals carried by maintenance engineers, thereby to diminish artificial mistakes, for example, that the failure of the radio access point is coped with later because a certain maintenance engineer does not take note of the occurrence of the failure.

In order to accomplish the objects, the invention configures a radio access point shown in FIG. 2 by way of example. Concretely, a radio access terminal portion 213 having a radio communication function is connected within an access point diagnosis unit 201, and a radio signal processing portion 203 and the access point diagnosis unit 201 are connected by employing directional couplers connected to the antennas (208-211) of the radio access point 100, so as to be couplable in any desired direction. According to the above technique, the radio access terminal portion 213 can be used only for the diagnosis of the radio access point 100. In the invention, however, a nondirectional antenna 218 can be connected to the radio access terminal portion 213 by the changeover of a switch 217 as shown in FIG. 2, and the radio access terminal portion 213 is capable of radio communications without using the antennas (208-209) disposed in the radio access point 100, likewise to a portable access terminal which is generally known. Owing to the use of the antenna 218, even in a case where any failure has occurred in, for example, a radio portion (205 or 206), the radio signal processing portion 203 or a line interface portion 204 as shown in FIG. 2, an adjacent radio access point located nearby is catchable, and a root for transmitting the failure notice of the access point of the radio access terminal portion 213 can be flexibly determined. In a case where the radio access point 100 can operate normally, the failure notice of the radio access point can be transmitted to a specified portable access terminal as a prompt report, through a first path 215 wired with the access point diagnosis unit 201 within the access point. In addition, even in a case where the radio access point 100 is not communicable on account of the fault of, for example, the line interface portion 204 which connects the radio access point 100 and an external network, the antenna 218 and the radio access terminal portion 213 are connected by the switch 217, whereby the failure notice can be given to the specified portable access terminal as a prompt report along a second path 216 and through the adjacent access point located nearby.

By way of example, the invention provides a radio access point in, for example, a radio communication system, characterized by comprising a radio access terminal portion which has a radio communication function, an access point diagnosis unit which has the function of controlling the radio access terminal portion so as to execute a test of connection with the access point, an RF selection portion in which the radio signal components of a frequency of 800-MHz band and a frequency of 2-GHz band for transmission and reception by the radio access terminal portion are changed-over by a switch and which includes attenuators for adjusting radio input/output signals, a sector selection unit in which the radio signals selected by the RF selection portion are changed-over by switches for respective sectors to-be-connected, a radio reception part of one loop or radio reception parts of two loops as has/have the function of receiving forward radio signals transmitted from the radio access terminal portion and an external portable access terminal, a radio transmission part which has the function of transmitting reverse radio signals to the radio access terminal portion and the external portable access terminal, an antenna of one loop or antennas of two loops which has/have the function of transmitting and receiving radio signals to and from the portable access terminal, a digital signal processing portion which has the functions of modulating and demodulating the radio signals and which has the function of processing a calling connection with the portable access terminal, and an access point controller which has the function of controlling the whole access point, wherein the access point diagnosis unit is used for performing the connection test of the access point, so as to detect the existence or nonexistence of any failure of the radio access point, and in case of the detection of the existence of the failure, failure information is notified to the specified portable access terminal by employing the radio communication function of the radio access terminal portion.

Besides, the invention consists in the above radio access point having means for notifying the failure information to the specified portable access terminal, characterized by comprising means for notifying the failure information to the specified portable access terminal without altering the configuration of the connection test of the access point.

The invention consists in the above radio access point, characterized in that an SMS is employed as the means for notifying the failure information to the specified portable access terminal.

The invention consists in the above radio access point, characterized in that the technique of transmitting an IP packet to an IP address bestowed on the portable access terminal is employed as the means for notifying the failure information to the specified portable access terminal.

The invention is characterized in that the above failure information contains the degree of importance of the failure which has occurred, information with which the radio access point undergoing the failure can be identified, and information which concerns a failure occurrence part.

The invention is characterized in that the radio access terminal portion has the function of judging whether or not the access point of its own is communicable, in the case of notifying the above failure information, and that the radio access terminal portion notifies the failure information through an adjacent radio access point in a case where the notification of the failure information through the access point of the radio access terminal portion is impossible.

According to the first solving means of this invention, there is provided an access point comprising:
a radio portion which receives and/or transmits a radio signal;
a signal processing portion which executes modulation, demodulation and calling-connection processing of the radio signal;
a line interface for connecting to a network;
a radio access terminal portion which has a transmitter and a receiver of a radio access terminal, and which transmits the radio signal to said radio portion and receives the radio signal from said radio portion;
a diagnosis control unit which controls said radio access terminal portion to execute a predetermined diagnostic test of the access point thereof;

an antenna which is connected with said radio access terminal portion directly or through a switch, and through which said radio access terminal portion communicates with another access point; and the switch which connects said radio access terminal portion to either of said antenna and said radio portion;

wherein:

said radio access terminal portion and said radio portion are connected by said switch;

the diagnostic test is performed by said diagnosis control unit by using said radio access terminal portion and said radio portion which are connected; and in accordance with a failing part as a result of the diagnostic test, (1) said radio access terminal portion and said radio portion are connected by said switch, and said radio access terminal portion transmits failure information which contains the failing part and/or a failure content to a predetermined radio access terminal by a first path through said radio portion, said signal processing portion and said line interface, or (2) said radio access terminal portion and said antenna are connected by said switch, and said radio access terminal portion transmits the failure information to the predetermined radio access terminal by a path which is a second path through said antenna and the other access point and in which any failure is not detected.

According to the second solving means of this invention, there is provided an access point comprising:

a radio portion which receives and/or transmits a radio signal;

a radio access terminal portion which has a transmitter and a receiver of a radio access terminal, and which transmits the radio signal to said radio portion and receives the radio signal from said radio portion;

a diagnosis control unit which controls said radio access terminal portion to execute a predetermined diagnostic test of the access point thereof;

an antenna which is connected with said radio access terminal portion directly or through a switch, and through which said radio access terminal portion communicates with another access point; and the switch which connects said radio access terminal portion to either of said antenna and said radio portion;

wherein:

said radio access terminal portion and said radio portion are connected by said switch;

the diagnostic test is performed by said diagnosis control unit by using said radio access terminal portion and said radio portion which are connected; and said radio access terminal portion and said antenna are connected by said switch, and said radio access terminal portion transmits failure information which contains a failing part and/or a failure content to a predetermined radio access terminal by a path through said antenna and the other access point.

According to the invention, it is realizable to notify the result of an access point diagnosis to a specified portable access terminal other than a maintenance center. Besides, according to the invention, it is realizable to notify the failure information of an access point to the specified portable access terminal even in a case where the radio access point cannot communicate with the maintenance center on account of any failure. According to the invention, the notification method indicated above can be realized without altering the diagnostic method of a known radio access point, and by remodeling the configuration of the radio access point on a small scale. According to the invention, a radio access terminal portion uses an SMS which is a known technique or a known technique (refer to, for example, Patent Document 3) in which the International Mobile Subscriber Identity (IMSI) for use in the identification of a portable access terminal is translated into an IP address so as to transmit an IP packet to the specified IP address, whereby the portable access terminal of a notification destination can realize the reception of the notice of the failure information of the radio access point by the existing data communication technique. Especially the SMS is the known technique in a present-day radio communication system, and has the important merit that a traffic necessary for the transmission of a message is very small.

According to the invention, it is possible to realize a maintenance operation which enhances responsiveness more flexibly, in such a way that, even in a case where the maintenance engineer of a radio access point is not present in a maintenance center as in the prior art, failure information is notified to a specified portable access terminal carried by the maintenance engineer, whereupon the maintenance engineer remotely accesses a maintenance access terminal (PC) installed in, for example, the maintenance center. Besides, according to the invention, it is possible to set a plurality of portable access terminals to which failure information is notified, and to expand the failure information of identical content in the portable access terminals carried by maintenance engineers, thereby to diminish artificial mistakes, for example, that the failure of the radio access point is coped with later because a certain maintenance engineer does not take note of the occurrence of the failure.

BRIEF DESCRIPTION OF THE DRAWINGS

FIG. 8 is a table format diagram of an address translation device 613;

FIG. 9 is a table format diagram of a subscriber information DB 614;

FIG. 10 is a format diagram of an address table which a radio communication network 106 has;

DESCRIPTION OF THE PREFERRED EMBODIMENTS OF THE INVENTION

1. First Embodiment

Now, this embodiment will be described with reference to the drawings.

(Hardware Architecture)

Figure 1:
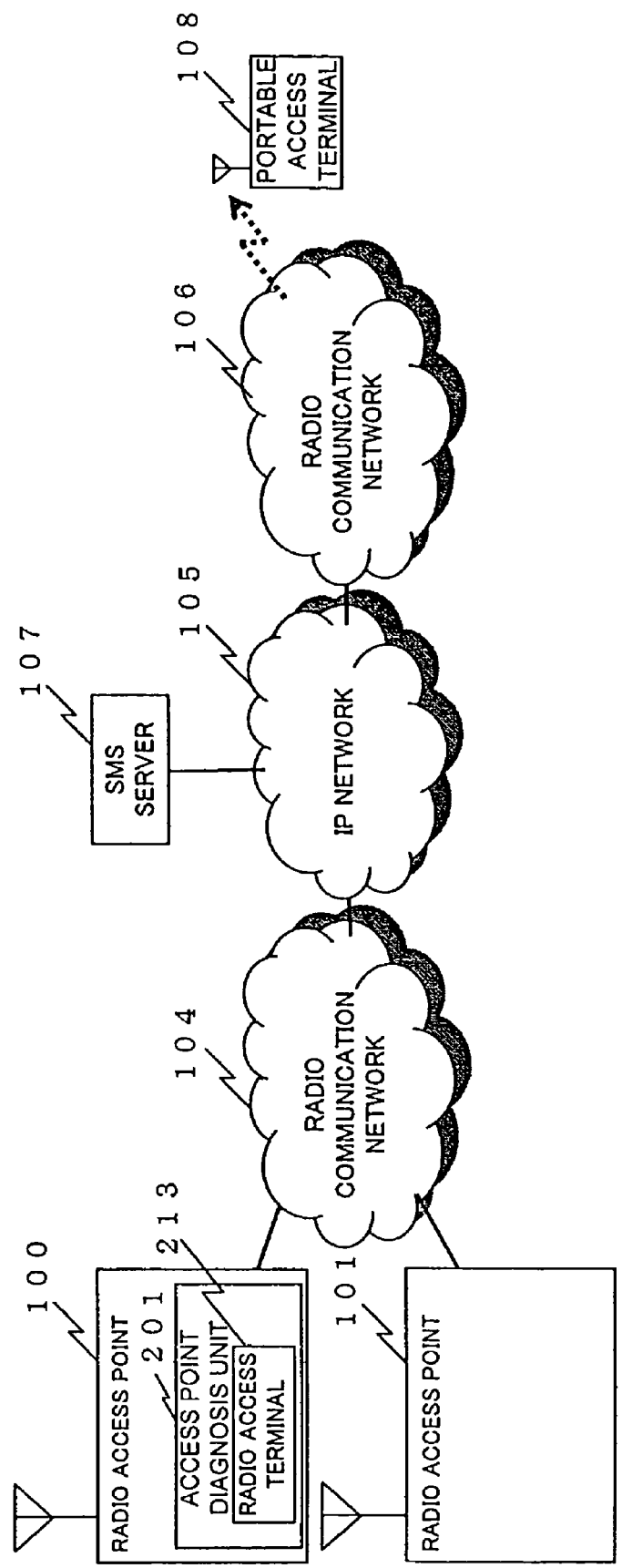
FIG. 1 is a system architectural diagram in the case where the failure information of a radio access point is communicated.

FIG. 1 shows the architecture of a radio communication system according to this embodiment. According to this configuration, the radio communication system includes a plurality of radio access points (100, 101), an SMS server 107, and aportable access terminal 108 having a radio communication function. Besides, in the radio communication system, individual devices are communicable through radio communication networks (104, 106) and an IP network 105 (Internet Protocol network). The radio communication system further includes a maintenance access terminal, and the radio access point 100 and the portable access terminal 108 can communicate with, for example, the maintenance access terminal. The radio access point 100 has an access point diagnosis unit 201 in which a radio access terminal portion 213 is included. This radio access point 100 has the function of confirming the connections thereof by controlling the access point diagnosis unit 201 and the radio access terminal portion 213.

The radio communication network 104 is a communication network to which the plurality of radio access points (100, 101) are connected by wire. This radio communication network 104 has the function of controlling radio packets, and it is communicable with the other devices and the other radio communication network 106 through the IP network 105. The IP network 105 has the plurality of radio communication networks (104, 106) and the SMS server 107 connected thereto, and it has the function of controlling an IP packet.

The SMS server 107 has the function of managing the transmission and reception of a short message service (hereinbelow, abbreviated to "SMS"), and it has the function of analyzing the destination of the SMS and distributing a message. The portable access terminal 108 has the function of radio communications. Especially, the portable access terminal 108 shown in this embodiment has the function of the transmission and reception of the SMS.

In this embodiment, the radio access point 100 has the function of confirming the connections of this radio access point 100 by employing the access point diagnosis unit 201 and the radio access terminal portion 213. In a case where the radio access point 100 has detected any failure thereof, it communicates (promptly reports) the failure information thereof to the specified portable access terminal 108 by the SMS. The diagnosis of the radio access point 100 and the failure information communication at the failure detection will be described with reference to the drawings below.

Figure 2:
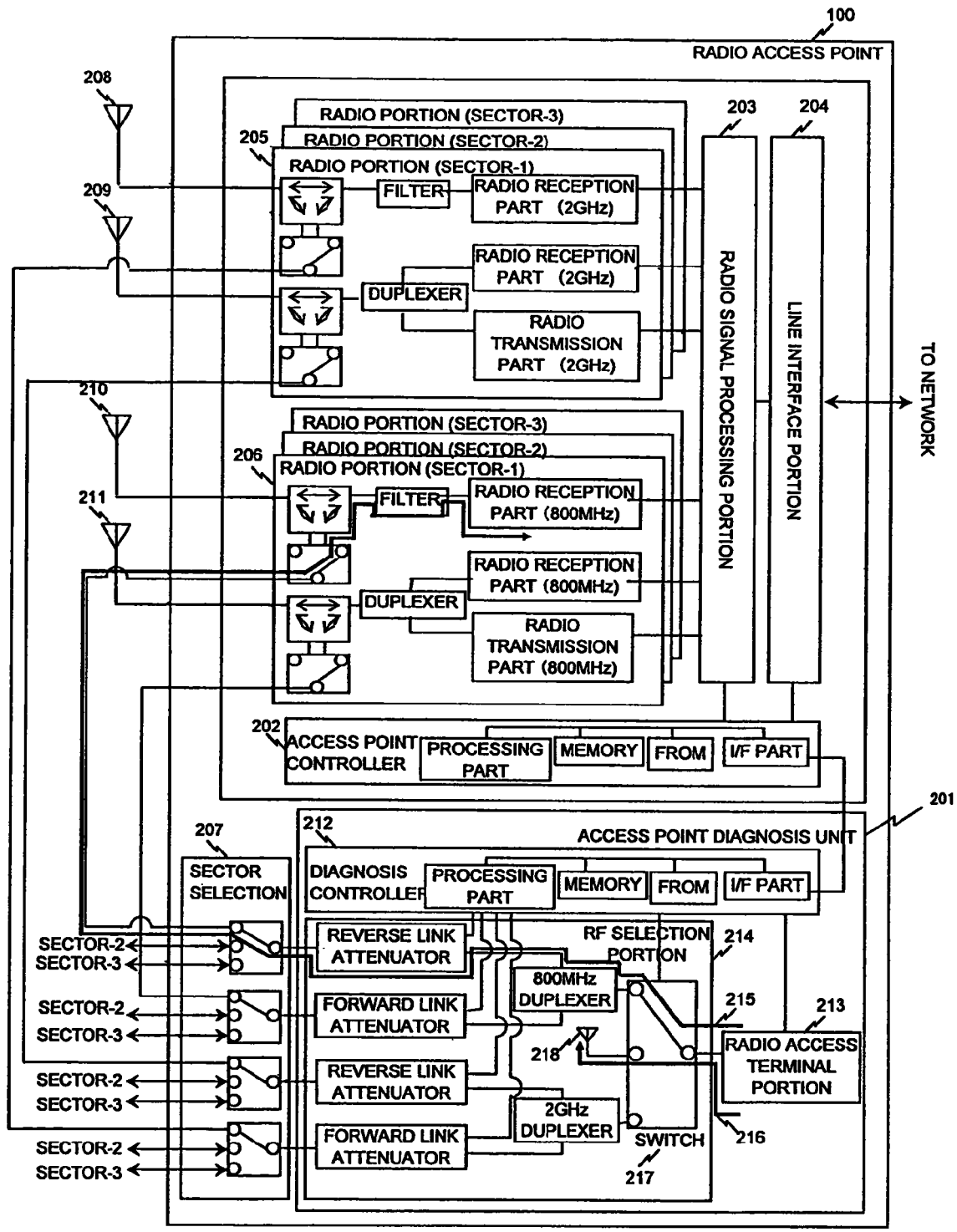
FIG. 2 is a block diagram showing the configuration of the radio access point 100.

FIG. 2 is a block diagram showing a configurational example of the radio access point 100 shown in FIG. 1. The radio access point 100 includes the access point diagnosis unit 201, an access point controller 202, a radio signal processing portion 203, a line interface portion 204, a 2-GHz-band radio portion 205 and/or an 800-MHz-band radio portion 206, a sector selection unit 207, and antennas 208-211. Incidentally, both or either of the 2-GHz-band radio portion 205 and the 800-MHz-band radio portion 206 may be disposed. Alternatively, at least one radio portion of another frequency band may well be disposed.

The access point diagnosis unit 201 includes a diagnosis controller 212, the radio access terminal portion 213, an RF selection portion 214 and an antenna 218, and it has the function of diagnosing the access point 100.

The diagnosis controller 212 has a processing part, a memory, an FROM (flash ROM) and an I/F part. The diagnosis controller 212 controls the radio access terminal portion 213 and the RF selection portion 214 in compliance with the command of performing a connection test as given by the access point controller 202, thereby to perform a predetermined diagnostic test. The diagnostic test can diagnose, for example, the normality/abnormality of the access point, and the proprieties of call originating and call reception. Incidentally, the diagnostic test may well be the measurement of a sensitivity or any other appropriate diagnosis or failure detection test.

The radio access terminal portion 213 has the radio communication function, and it is used for the diagnostic test. Besides, in this embodiment, the radio access terminal portion 213 has the function of transmitting an SMS message.

The RF selection portion 214 has a switch 217, duplexers, and attenuators. This RF selection portion 214 is controlled by the diagnosis controller 212, and it can adjust forward and reverse radio signals by employing the attenuators included therein. The duplexers duplex the forward signals and the reverse signals. The duplexers and the attenuators can be disposed for respective frequencies. The switch 217 of the RF selection portion 214 functions to select the frequency of radio signals which are to be transmitted and received by the radio access terminal portion 213, and also to select the communications with the access point of its own or the communications with the other access point through the antenna 218, in compliance with commands from the diagnosis controller 212. By way of example, the radio access terminal portion 213 and the 800-MHz duplexer are connected by the switch 217, and the radio signal outputted from the radio access terminal portion 213 is received by a radio reception part within the radio portion 206 as indicated at a path 215, thereby to perform the test for measuring a sensitivity. Besides, failure information can be communicated from the radio access terminal portion 213 to the portable access terminal 108 through the path 215. When the radio access terminal portion 213 and the antenna 218 are connected by the switch 217, this radio access terminal portion 213 can communicate with the other access point through a path 216.

The antenna 218 can be disposed separately from the antennas 208-211 through any of which the access point 100 communicates with an appropriate radio access terminal. This antenna 218 is connected to the radio access terminal portion 213, for example, directly or through the switch 217.

The access point diagnosis unit 201 reports the result of the test performed as stated above, to the access point controller 202. On this occasion, in a case where the test result report could not be properly made on account of the failure of the communication interface between the access point diagnosis unit 201 and the access point controller 202, this access point diagnosis unit 201 judges the situation as the occurrence of an internal communication failure.

The access point controller 202 includes, for example, a processing part, a memory, an FROM and an I/F part, and it has the function of controlling the whole radio access point. By way of example, in this embodiment, in a case where an instruction for performing the connection test of the radio access point has been received from a maintenance center through the line interface portion 204, or when a predetermined test time has been reached, the command for performing the connection test of the radio access point is given to the access point diagnosis unit 201.

The radio signal processing portion 203 demodulates the forward signal and modulates the reverse signal by way of example. The line interface portion 204 is an interface for connection with the radio communication network 104.

Each of the radio portions (205, 206) is a unit having the function of processing the radio signals, and it includes, for example, directional couplers, switches, a filter, a duplexer, radio reception parts and a radio transmission part. Incidentally, the access point 100 can be endowed with a diversity configuration. As shown in FIG. 2 by way of example, the access point 100 can include the antenna 208 and radio reception part of loop-0 and the antenna 209 and radio reception part of loop-1. Alternatively, the access point 100 may well be a system in which an antenna and a radio reception part of single loop are disposed. The sector selection unit 207 selects any of sector-1 through sector-3, and it connects the sector (for example, the switch of the corresponding sector) and the attenuators of the RF selection portion 214.

(Data Format)

Figure 3:
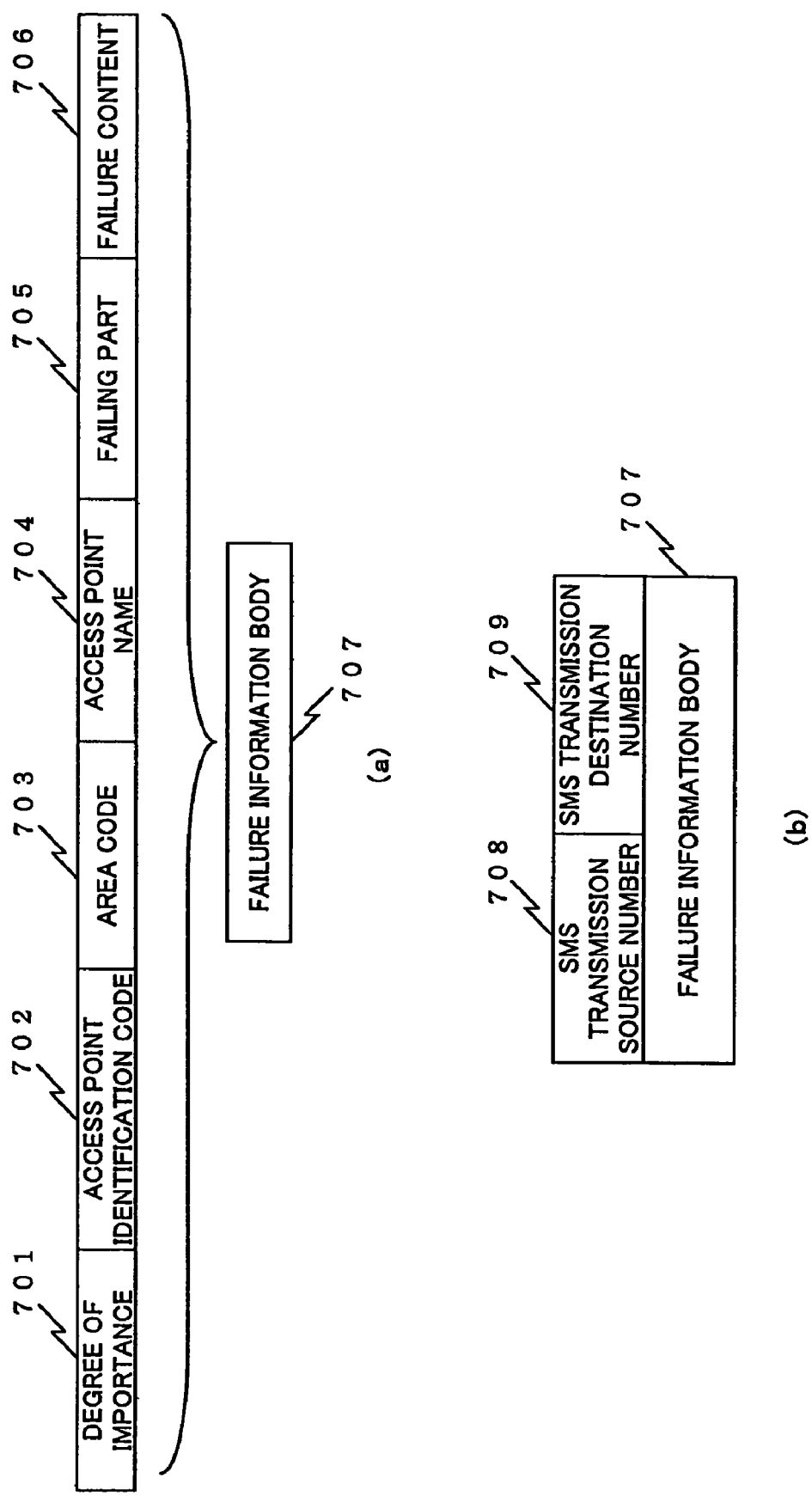
FIGS. 3A and 3B are explanatory diagrams of the format of a message which is used in a case where the failure information of the radio access point is communicated by an SMS or IP packet.

Shown in FIGS. 3A and 3B is the format of the message which is notified to the portable access terminal 108 carried by a maintenance engineer, by the SMS when the access point failure has been detected. The failure notice message contains an SMS transmission source number 708, an SMS transmission destination number 709 and a failure information body 707. The SMS transmission source number 708 is a number which is assigned to the access terminal function portion 213. The SMS transmission destination number 709 is the number of the portable access terminal 108. The SMS transmission source number 708 and the SMS transmission destination number 709 can be stored in the memory of, for example, the access point diagnosis controller 212 or the access point controller 202 beforehand. As shown in FIG. 3A, the failure information body 707 contains the degree of important 701, an access point identification code 702, an area code 703, an access point name 704, a failing part 705 and a failure content 706.

The degree of importance 701 indicates the degree of importance of the failure having occurred, and "CR" (Critical), "MJ" (Major) and "MN" (Minor) are defined by way of example. The degree CR might lead to the shutdown of the radio communication service, and it is communicated upon the occurrence of the failure with which the maintenance engineer needs must cope immediately. The degree MJ is communicated upon the occurrence of the failure which does not lead to the shutdown of the radio communication service, but with which the maintenance engineer needs to cope immediately. The degree MN is communicated upon the occurrence of the failure which does not exert influence on the operation of the radio communication service, but with which the maintenance engineer needs to cope. These degrees of importance are predetermined by, for example, the constituent parts, and they can be determined in accordance with the failing parts and the failure contents detected by the diagnosis controller 212. Incidentally, the degrees of importance can be appropriately defined otherwise than the above. Besides, they can be defined in an appropriate number.

The access point identification code 702 is an identification code which indicates the access point undergoing the failure, and such identification codes are uniquely afforded to the respective access points within the identical area of the radio communication system. The area code 703 is an identification code which is uniquely afforded every area in the radio communication system. The access point name 704 is an identifying name which is afforded to each individual radio access point. By way of example, the name of land where the access point is installed is afforded, whereby the access point name 704 is set so as to be capable of grasping a concrete place. Incidentally, the access point identification code 702, area code 703 and access point name 704 can be stored in the memory of, for example, the access point diagnosis controller 212 or the access point controller 202 beforehand.

The failing part 705 is a code which indicates the part undergoing the failure (failing part detected by the diagnosis controller 212). As shown by the configuration of the radio access point in FIG. 2, the failing part 705 contains the code/codes of one or more of, for example, the line interface portion 204, radio signal processing portion 203, radio portions (205, 206), access point controller 202, access point diagnosis unit 201, sector selection unit 207 and RF selection portion 214.

In the case where the access point diagnosis unit 201 has detected the access point failure, it generates the failure information message in conformity with the above message format. Besides, it sets as the failure information body 707, a message which is formed of the degree of importance 701, access point identification code 702, area code 703, access point name 704, failing part 705 and failure content 706. In the case of communicating the failure information by the SMS, the access point diagnosis unit 201 reads out the SMS transmission source number 708 and the SMS transmission destination number 709 from the memory and affixes them to the failure information body 707, and it transmits the resulting message to the SMS server 107. By the way, in the case of transmitting the IP packet, the IP packet (710) containing the address of the communication destination is affixed and transmitted (the details of this aspect will be stated later).

(Flow Chart)

Figure 4:
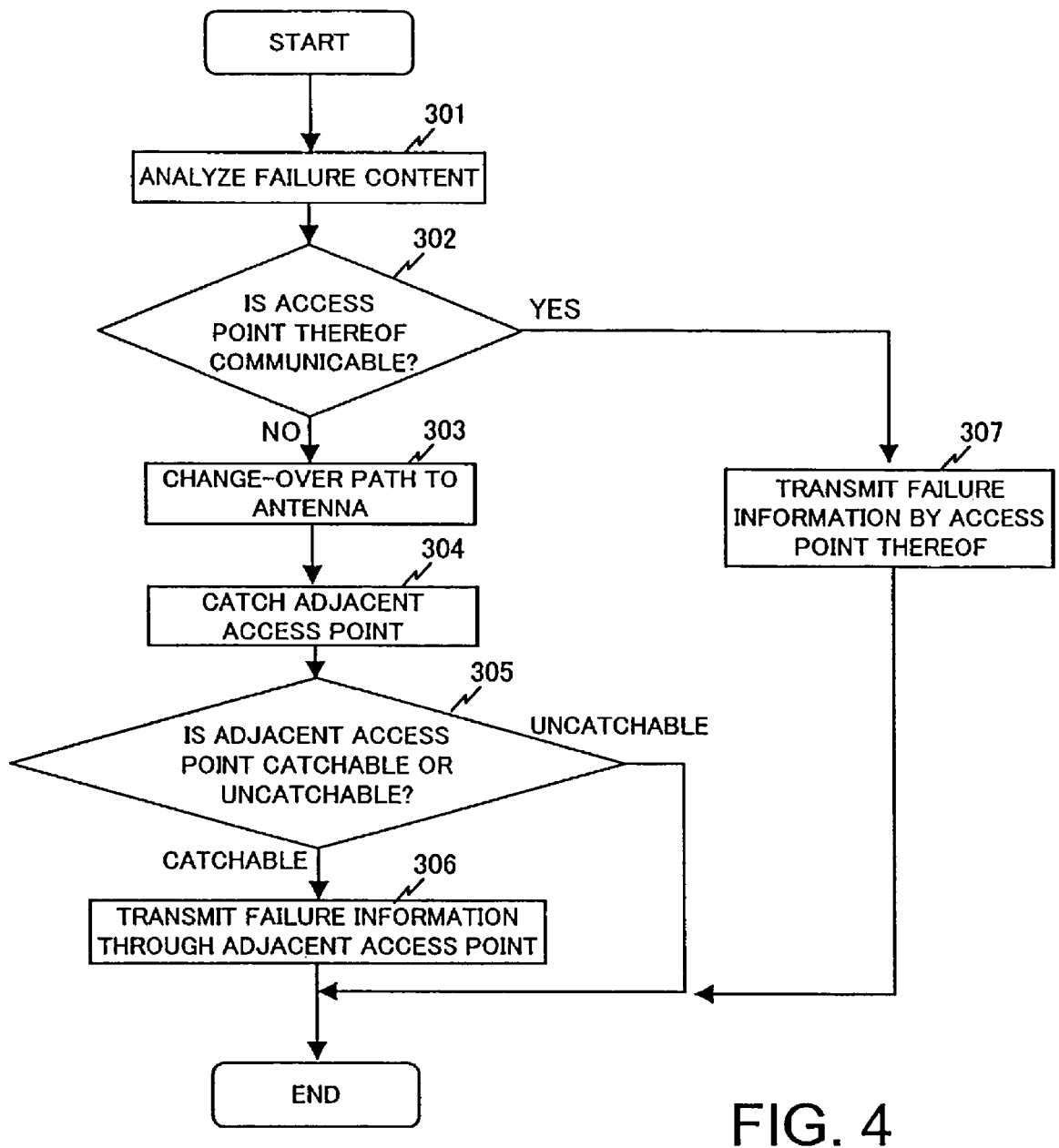
FIG. 4 is a flow chart in the case where an access point diagnosis unit having detected any failure judges which of the access point of its own and an adjacent access point is to be caught for the purpose of transmitting a failure notice.

FIG. 4 is a flow chart in the case where the failure of the access point has been detected by the access point diagnosis unit 201. When the access point diagnosis unit 201 has performed the predetermined test in compliance with the command from the access point controller 202 and has detected any failure, it further executes processing to be stated below.

The access point diagnosis unit 201 analyzes the failure of the access point as has occurred (step 301). Here will be described, for example, the case where the communication failure between the access point diagnosis unit 201 and the access point controller 202 has been judged. Subsequently, in transmitting a failure information notice, the access point diagnosis unit 201 judges if the notice is communicable by the access point of its own, on the basis of the analyzed result of the failure (step 302). By way of example, the access point diagnosis unit 201 judges if any failure does not exist on the first path 215 shown in FIG. 2. In a case where the access point diagnosis unit 201 has judged that the failure having occurred does not exert influence on the radio communications of the radio access point ("YES" at the step 302), it transmits the failure information notice to the access point of its own (step 307). By way of example, the access point diagnosis unit 201 creates the failure notice message shown in FIGS. 3A and 3B. Besides, the access point diagnosis unit 201 connects the radio access terminal portion 213 and the radio portion 205 or 206 by the switch 217, and it transmits the failure notice message from the radio access terminal portion 213 to the portable access terminal 108 along the first path 215 tracing the radio portion 205 or 206, signal processing portion 203 and line interface portion 204, and via the predetermined SMS server 107.

Incidentally, the first path 215 stated above may well be a path tracing the radio portion 205 of 2 GHz as shown in FIG. 2, unlike the path tracing the radio portion 206 of 800 MHz. Besides, the first path 215 may well be a path tracing an appropriate sector. If any of the plurality of paths is failureless, the failureless path may well be selected by the switch 217 and the sector selection unit 207 so as to communicate the failure notice message by employing the path.

In a case where the access point diagnosis unit 201 has judged that the communications by the access point of its own is impossible, as the judgment at the step 302 ("NO" at the step 302), it changes-over the switch 217 in FIG. 2, thereby to connect the radio access terminal portion 213 and the antenna 218 (step 303). Owing to the changeover of the switch 217, the radio access terminal portion 213 becomes capable of catching radio waves from the adjacent radio access point 101 located nearby, likewise to a general portable access terminal without being influenced by the failure of the radio access point 100. The radio access terminal portion 213 catches the nearby and adjacent radio access point for a certain predetermined time period (step 304). On this occasion, in a case where a plurality of radio access points (radio waves) are catchable by way of example (step 305), the radio access terminal portion 213 can select the radio access point of the best communication quality. Incidentally, since identification codes for identifying radio access points are uniquely set for the respective access points, the radio access point portion 213 does not select radio waves from the access point of its own and can distinguish the radio access point adjacent to the access point of its own, by referring to the identification code. To the contrary, in a case where any adjacent radio access point located nearby is uncatchable even after the lapse of the predetermined time period (step 305), the catching operation by the radio access terminal portion 213 is ended. In the case where the adjacent radio access point has been successfully caught at the step 305, the failure notice message is transmitted to the portable access terminal through the antenna 218 as well as the caught radio access point and via the SMS server 107 (step 306). The access point diagnosis unit 201 determines the access point to which the failure notice message is to be transmitted, on the basis of the above flow chart shown in FIG. 4.

Next, there will be described the processing (step 306 or 307) in which the failure information notice is transmitted by the SMS by employing the radio access terminal portion 213.

Figure 5:
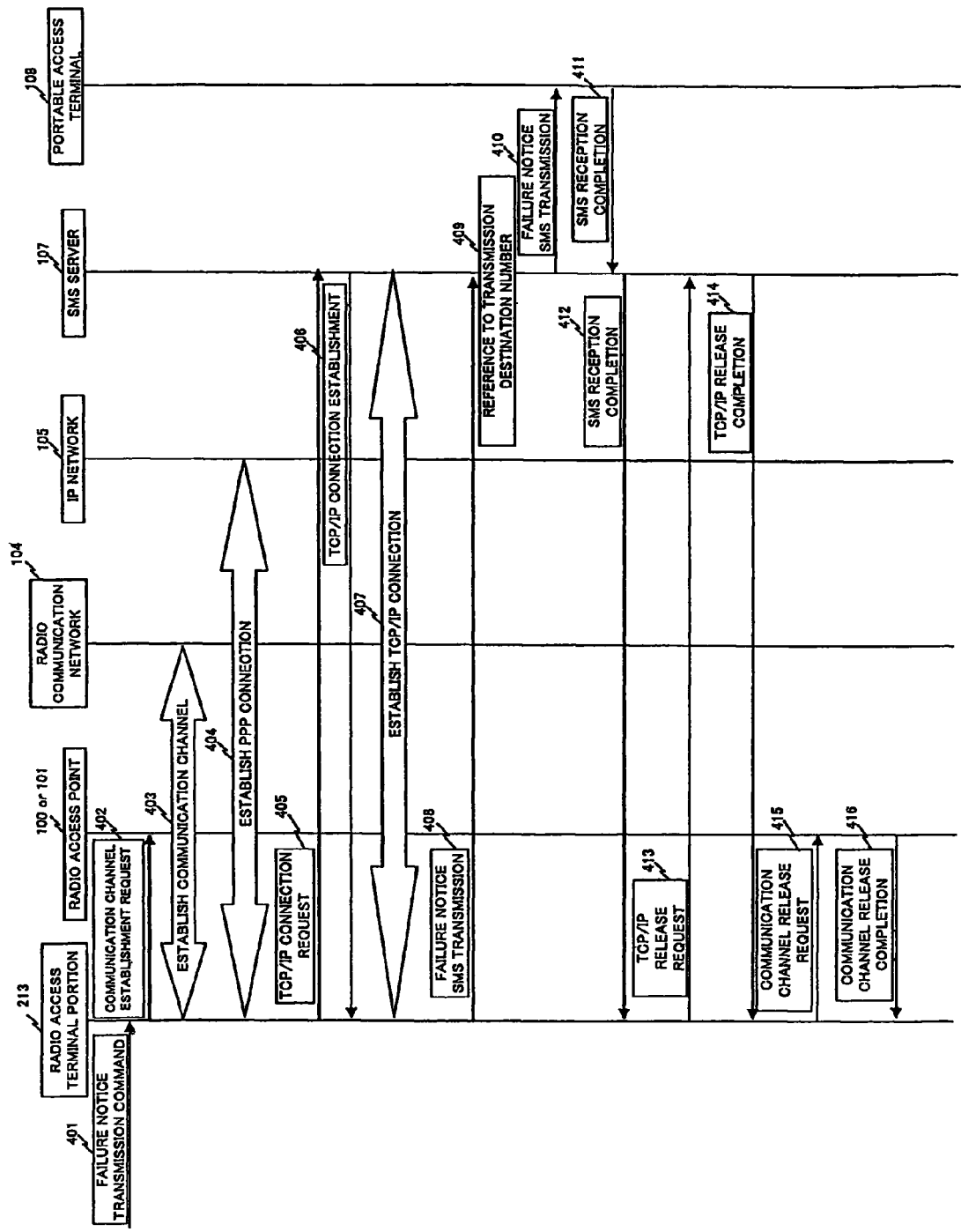
FIG. 5 is a sequence diagram for communicating failure information by employing an SMS.

FIG. 5 is a sequence diagram for communicating the failure information by employing the SMS.

First, the access point diagnosis unit 201 or the access point controller 202 transmits a failure notice transmission command to the radio access terminal portion 213 in order to transmit the failure information by the radio communication (step 401). The failure notice transmission command contains, for example, the created failure notice message. The radio access terminal portion 213 having received the failure notice transmission command transmits a communication channel establishment request to the radio access point 100 or 101 in order to establish the communication channel thereof with the radio communication network 104 (step 402). Incidentally, the radio access terminal portion 213 makes the communication channel establishment request for the access point 100 of its own or the adjacent radio access point 101 located nearby, in accordance with the result of the flow chart shown in FIG. 4. After the transmission of the communication channel establishment request, the radio access terminal portion 213 establishes the communication channel between it and the radio communication network 104, via the radio access point (step 403). After the establishment of the communication channel, the radio access terminal portion 213 establishes a PPP (Point to Point Protocol) connection between it and the IP network 105 (step 404).

After the establishment of the PPP connection, the radio access terminal portion 213 transmits a TCP/IP connection request to the SMS server 107 in order to establish a TCP/IP connection for the purpose of transmitting and receiving data to and from the SMS server 107 (step 405). The SMS server 107 transmits a TCP/IP connection establishment in compliance with the TCP/IP connection request (step 406). Thenceforth, the TCP/IP connection is established between the radio access terminal portion 213 and the SMS server 107 (step 407). After the establishment of the TCP/IP connection, the radio access terminal portion 213 transmits in an SMS format, the failure notice message which has been created in conformity with the message format in FIGS. 3A and 3B and which has been received at the step 401 (step 408). As shown in FIG. 3B, the failure notice message which is transmitted contains the SMS transmission source number 708 (for which the International Mobile Subscriber Identity can be employed by way of example), the SMS transmission destination number 709 (for which the International Mobile Subscriber Identity can be employed by way of example), and the failure information body 707. When the SMS server 107 receives the failure notice message of the SMS format transmitted at the above step 408, it analyzes a destination stated in the message. By way of example, the SMS server 107 refers to the SMS transmission destination number 709 (step 409). Thereafter, the SMS server 107 transmits the failure notice message of the SMS format to the portable access terminal 108 designated by the SMS transmission destination number 709 (step 410). After the SMS reception of the above failure notice message, the portable access terminal 108 transmits a reception completion message to the SMS server 107 (step 411). The SMS server 107 transmits an SMS reception completion message to the radio access terminal portion 213 on the transmission side, by referring to the SMS transmission source number 708 (step 412). The radio access terminal portion 213 receives the SMS reception completion message from the SMS server 107, confirms the completion of the SMS transmission and releases the TCP/IP connection established at the SMS transmission (steps 413-414). After the release of the TCP/IP connection, the radio access terminal portion 213 transmits a communication channel release request to the radio access point 100 or 101 so as to release the PPP connection with the radio communication network and the communication channel with the radio access point (steps 415-416).

As described above, the radio access point 100 and the access point diagnosis unit 201 are permitted to notify the information on the failure having occurred within the access point, to the specified portable access terminal by the method shown in FIGS. 2, 4 and 5.

Figure 6:
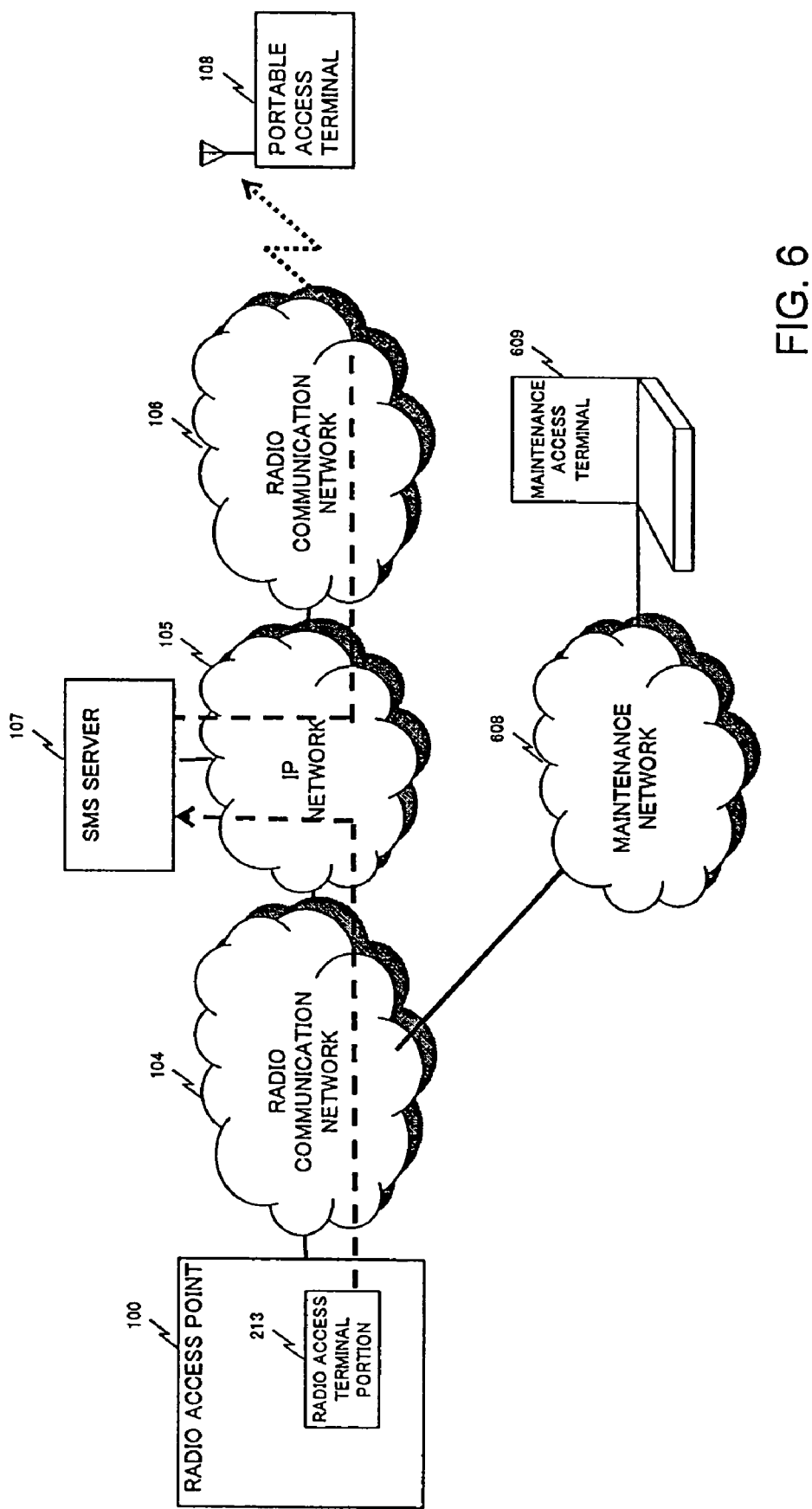
FIG. 6 is a configurational diagram for explaining the performance of the maintenance of the access point in the case where the failure notice has been received by the SMS.

FIG. 6 is a diagram for explaining the failure notification and the performance of maintenance. When the portable access terminal 108 receives the failure notice message from the radio access point 100, it displays the received message (for example, the failure information body 707) on a display unit by way of example. Even in a case where the maintenance engineer carrying the portable access terminal 108 is not present in the maintenance center, he/she can view the display of the portable access terminal 108 and can remotely access the maintenance access terminal (PC) 609 installed in the maintenance center, by employing the portable access terminal 108. Thus, a maintenance operation whose responsiveness is enhanced can be realized more flexibly.

2. Second Embodiment

Next, there will be described an embodiment which employs the technique of transmitting an IP packet to a specified portable access terminal (refer to, for example, Patent Document 3).

(Hardware Architecture)

Figure 7:
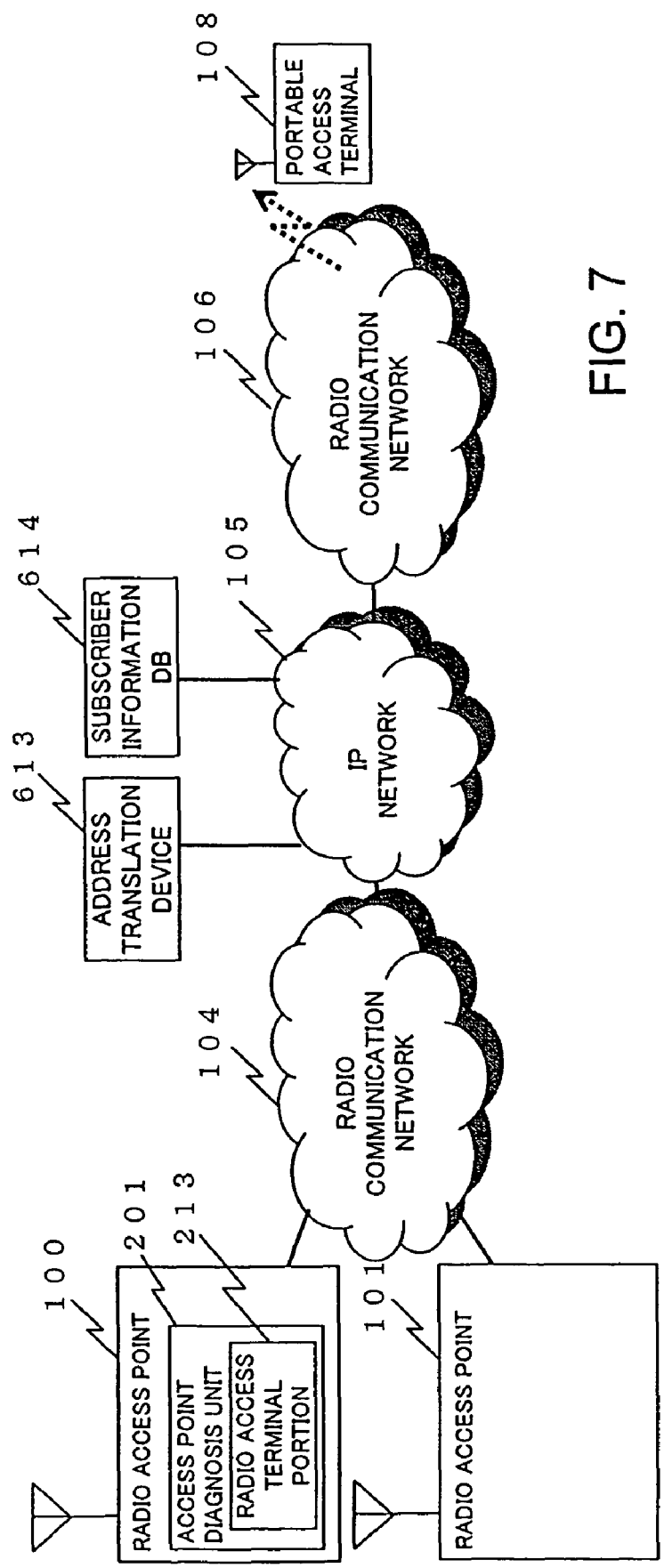
FIG. 7 is an architectural diagram of a radio communication system in a second embodiment.

FIG. 7 is an architectural diagram of a radio communication system in the second embodiment.

The radio communication system includes a radio access point 100, an address translation device 613, a subscriber information database (hereinbelow, termed "subscriber information DB") 614, and a portable access terminal 108 having a radio communication function. Besides, in the radio communication system, individual devices are communicable through radio communication networks (104, 106) and an IP network 105 (Internet Protocol network). The radio communication system further includes a maintenance access terminal, and the radio access point 100 and the portable access terminal 108 can communicate with the maintenance access terminal through, for example, a maintenance network.

When the address translation device 613 receives an IP address, it returns a corresponding subscriber ID to the radio access point. When the subscriber information DB 614 receives the subscriber ID, it returns corresponding subscriber information to the radio access point. Incidentally, the detailed configurations of the address translation device 613 and subscriber information DB 614 will be explained later. By the way, in the figure, the same constituents as in the first embodiment are assigned reference numerals identical to those of the first embodiment, and they shall be omitted from detailed description.

(Data Format)

FIG. 8 is a table format diagram of the address translation device 613.

In the address conversion device 613, IP addresses and subscriber IDs are stored in correspondence. The IP addresses and the subscriber IDs can be stored in, for example, an appropriate memory beforehand.

The International Mobile Subscriber Identity (IMSI), for example, can be employed for the subscriber IDs. The IMSI is data which is written in together with a telephone number when a portable telephone is purchased from a carrier. In a communication system based on portable telephones, the portable telephones are identified by employing the IMSI. Incidentally, appropriate identifiers may well be employed otherwise than the IMSI. The transmission destination IP addresses of IP packets, and the subscriber IDs (IMSI) are held in one-to-one correspondence as shown in the figure. In a case, for example, where the address translation device 613 has received "IP address A" from the radio access point (100 or 101), it reads out "IMSI A" as the corresponding subscriber ID and returns this subscriber address to the radio access point (100 or 101).

FIG. 9 is a table format diagram of the subscriber information DB 614.

In the subscriber information DB 614, subscriber IDs and subscriber information items are stored in correspondence. Address information on a network to which the portable access terminal specified by the subscriber ID is connected, is stated in the subscriber information. In a case, for example, where a plurality of radio communication networks 106 as shown in FIG. 7 exist and where the radio communication networks 106 are "radio communication network A", "radio communication network B" and "radio communication network C", respectively, the address information which specifies the radio communication network A, B or C communicable with the portable access terminal designated by the subscriber ID is stated in the subscriber information. The address information is used for transmitting the packets to the radio communication network 106.

FIG. 10 is a format diagram of an address table which the radio communication network 106 has.

In the address table, subscriber information items and the address information items of portable access terminals are stored in correspondence.

The address information of the portable access terminal 108 is a peculiar address which the radio communication network 106 uniquely affords to the portable access terminal 108 placed under its management of radio communications. In the radio communication network, the radio communications are performed with the managed portable access terminal by employing the address. By way of example, when the portable access terminal A is to perform the radio communications with the radio communication network A, "address A" is allocated to the portable access terminal A by the radio communication network A. The address A is held while the portable access terminal A lies within the communicable range of the radio communication network A. However, in a case where the portable access terminal A has moved out of the communicable range, the address A is annulled. Accordingly, the address information for the portable access terminal A is not always held identical.

In case of communicating with the portable access terminal A, the address information allocated by the radio communication network A is required. By way of example, the radio communication network 106 which has received the subscriber information A from the radio access point 100 reads out the address information allocated to the portable access terminal A (for example, the portable access terminal 108) as stored in correspondence with the subscriber information A, by referring to the address table, and it notifies the address information to the radio access point of a transmission source. Thus, a transmission side (for example, a radio access terminal portion 213) can obtain an address for transmitting the packets to the portable access terminal A.

Figure 11:
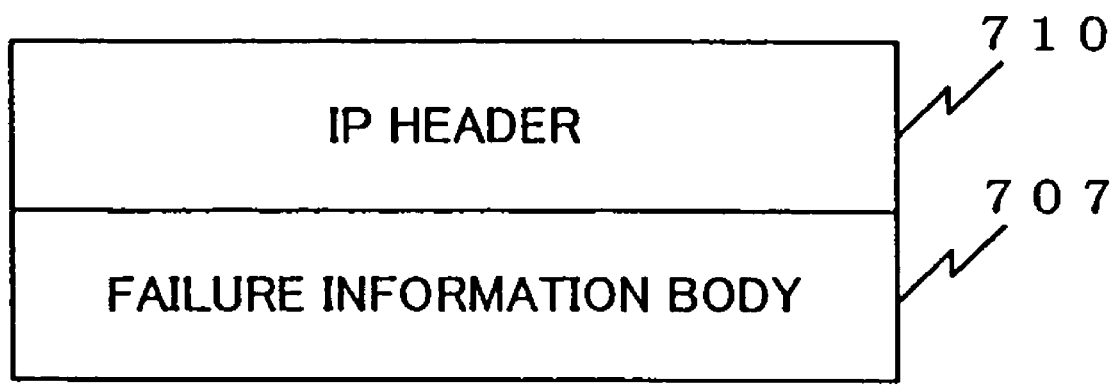
FIG. 11 is a data format diagram of an IP packet (a failure notice message) which is transmitted from a radio access terminal portion 213 to a portable access terminal 108.

FIG. 11 shows the data format of an IP packet (a failure notice message) which is transmitted from the radio access terminal portion 213 to the radio access terminal 108. The failure notice message contains, for example, an IP header 710 and a failure information body 707. The address information of the portable access terminal 108, for example, is contained in the IP header 710. Incidentally, the failure information body 707 is the same as in the first embodiment and shall therefore be omitted from detailed description (refer to, for example, FIG. 3A).

(Sequence)

The radio access point 100 (an access point diagnosis unit 201) executes the flow illustrated in FIG. 4 and the description thereof before. Incidentally, the details of the steps 301-305 are the same as in the first embodiment and shall therefore be omitted from description. Here, at the steps 306 and 307, an IP packet is transmitted, not the SMS message. Processing for transmitting a failure information notice by the IP packet will be described below.

Figure 12:
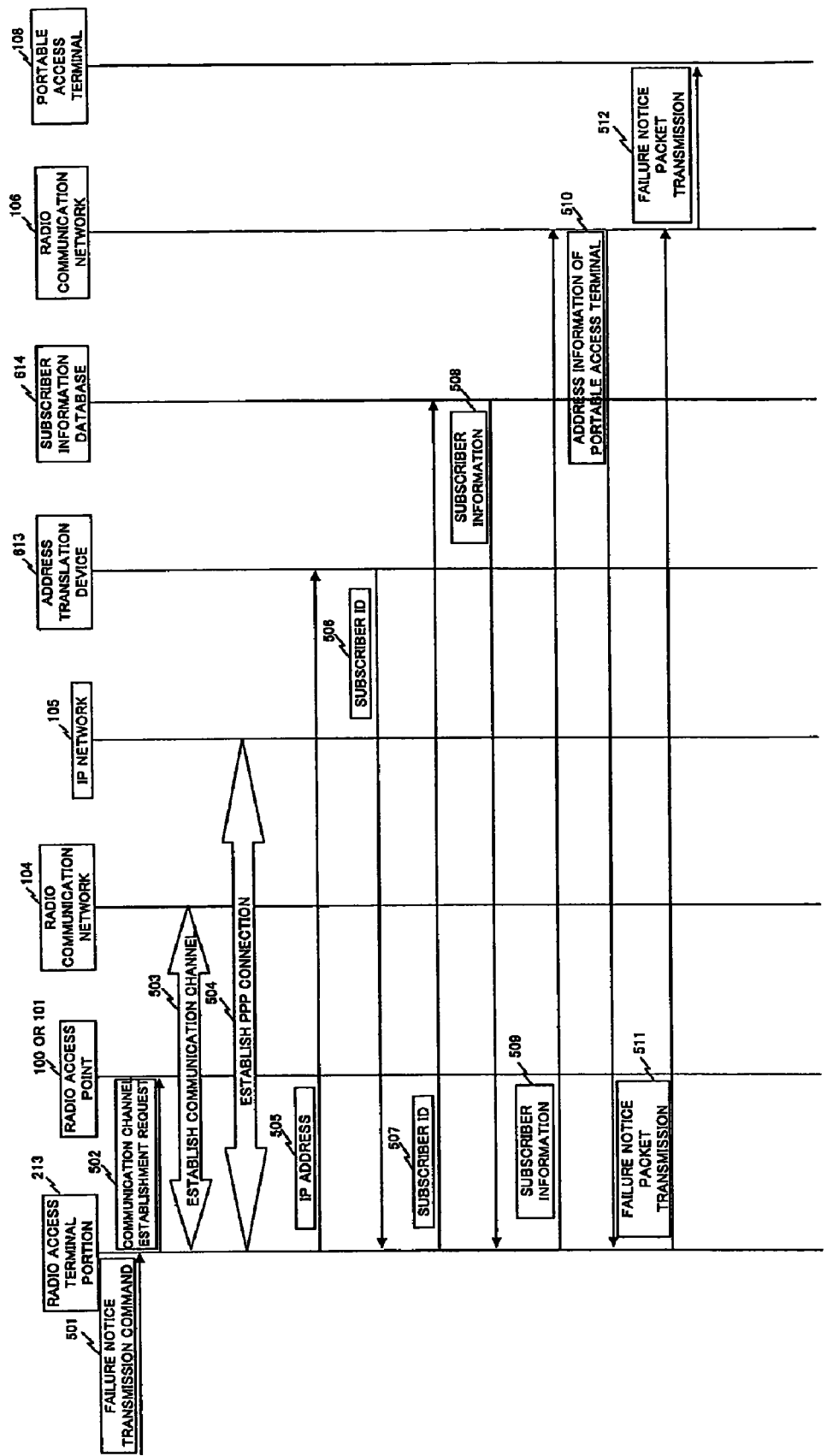
FIG. 12 is a sequence diagram for notifying failure information by employing the IP packet.

FIG. 12 is a sequence diagram for notifying failure information by employing the IP packet.

The access point diagnosis unit 201 or an access point controller 202 gives a failure notice transmission command to the radio access terminal portion 213 in order to transmit the failure information notice by a radio communication (step 501). The radio access terminal portion 213 having received the failure notice transmission command transmits a communication channel establishment request to the radio access point 100 or 101 in order to establish a communication channel between this radio access terminal portion 213 and the radio communication network 104 (step 502). On this occasion, in the same manner as in the case of the failure notification using the SMS in the first embodiment, the communication channel establishment request is made for the access point 100 of the radio access terminal portion 213 or the adjacent radio access point 101 located nearby, in accordance with the result of the flow chart shown in FIG. 4. After the transmission of the communication channel establishment request, the radio access terminal portion 213 establishes the communication channel between it and the radio communication network 104, via the radio access point 100 or 101 (step 503). After the establishment of the communication channel, a PPP (Point to Point Protocol) connection is established between the radio access terminal 213 and the IP network 105 (step 504).

Subsequently, the radio access terminal portion 213 transmits the IP address of the portable access terminal 108 to which the failure information is to be notified, to the address translation device 613 (step 505). The IP address of the portable access terminal 108 is stored in, for example, the memory of a diagnosis controller 212 or an access point controller 202 beforehand, and it can be notified to the radio access terminal portion 213. The address translation device 613 reads out the subscriber ID corresponding to the received IP address, by referring to the memory, and it transmits the read-out subscriber ID to the radio access terminal portion 213 (step 506). The radio access terminal portion 213 transmits the obtained subscriber ID to the subscriber information database 614 (step 507). The subscriber database 614 reads out the subscriber information corresponding to the received subscriber ID, and transmits the read-out subscriber information to the radio access terminal portion 213 (step 508). This subscriber information contains access point information for providing the IP packet to the portable access terminal 108 which is the transmission destination of the failure information. The radio access terminal portion 213 transmits the subscriber information to the radio communication network 106 (for example, an appropriate device within the communication network) which can provide the IP packet to the portable access terminal 108 being the transmission destination (step 509). The radio communication network 106 reads out the address information of the portable access terminal as can specify the portable access terminal 108 for use in the radio communication network 106, by referring to the address table on the basis of the received subscriber information, and it transmits the read-out address information to the radio access terminal portion 213 (step 510). The radio access terminal portion 213 affixes the received address information of the portable access terminal to the failure information body 707 created in the message format shown in FIGS. 11 and 3A, and transmits the resulting IP packet of the failure notice to the radio communication network 106 (step 511). The IP packet is formed of the IP header 710 and failure information body 707 as shown in FIG. 11, and the address information capable of specifying the portable access terminal 108 as has been acquired at the step 510 is contained in the IP header 710. The radio communication network 106 refers to the address information of the portable access terminal on the basis of the IP header 710 of the received IP packet of the failure notice, and transmits the IP packet of the failure notice to the corresponding portable access terminal 108 (step 512). In the above way, the failure notice can be transmitted to the specified portable access terminal as the IP packet, likewise to the method of the failure information notification employing the SMS in the first embodiment.

Figure 13:
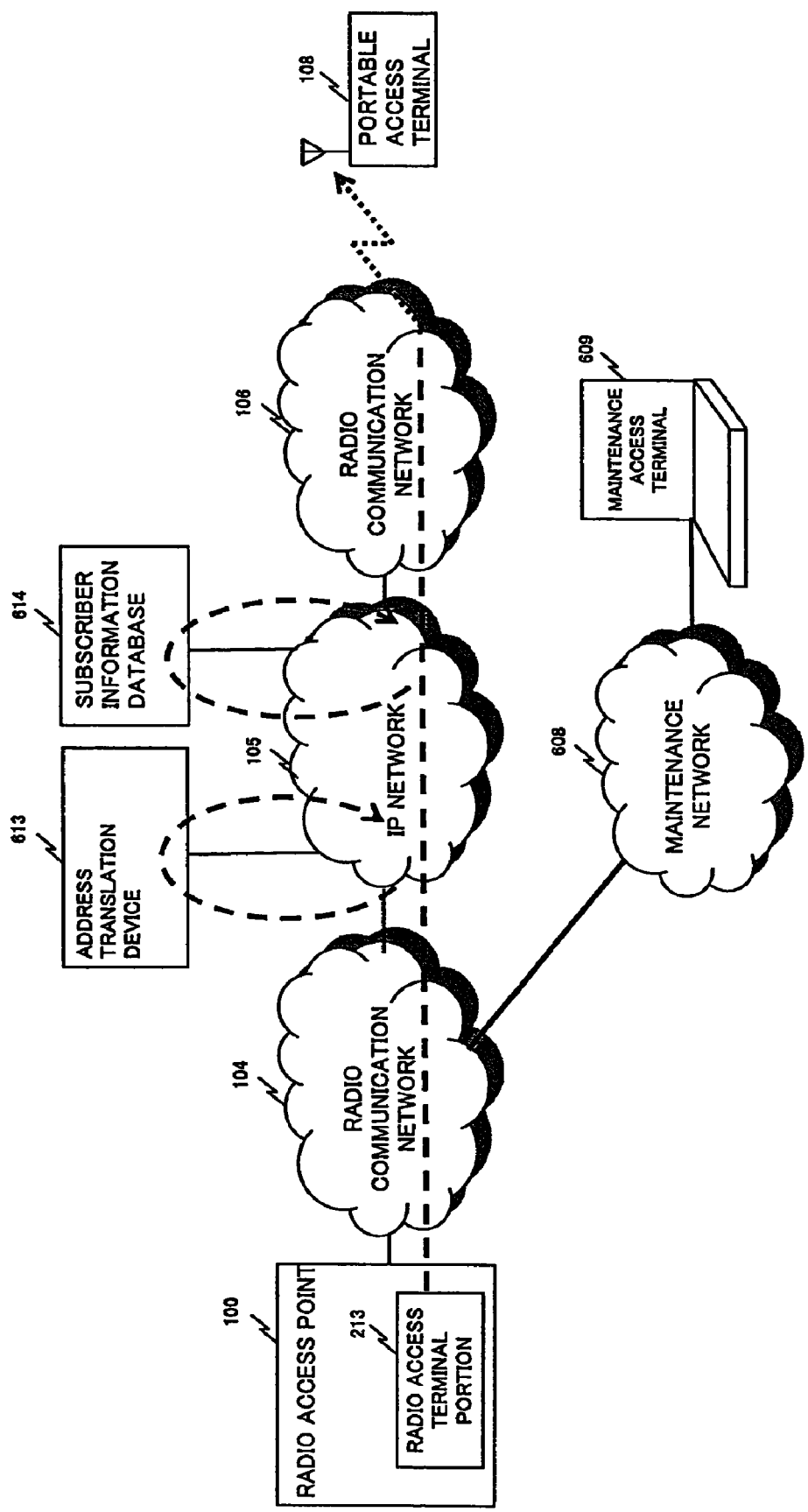
FIG. 13 is a diagram showing the outline of a case where a radio access point is maintained by employing this embodiment which notifies failure information to the specified portable access terminal.

FIG. 13 shows the outline of a case where the radio access point is maintained by employing this embodiment which notifies the failure information to the specified portable access terminal. The radio access point 100 notifies the failure information of this access point 100 to the portable access terminal 108 in the form of the IP packet by employing the radio access terminal portion 213. A maintenance network 608 is connected to the radio communication network 104, and the maintenance of the radio access point can be performed by a maintenance access terminal 609. In a case, for example, where that maintenance engineer of the access point who carries the portable access terminal 108 has received the failure information of the access point in the form of the IP packet in a place outside a maintenance center, he/she remotely logs into the maintenance access terminal 609, whereby the maintenance engineer can cope with the failure of the access point without being restrained by the place, and he/she is permitted to flexibly cope with the failure more quickly.

3. Modified Embodiment

The radio access terminal portion 213 and the portable access terminal 108 are endowed with a GPS function, whereby the positional information of the access point 100 can be notified to the specified portable access terminal 108. Alternatively, the positional information of the access point may well be measured and stored in a memory or the like beforehand. The radio access terminal portion 213 measures the positional information of the access point by the GPS function or reads out the positional information measured beforehand, and it sends the positional information to the portable access terminal 108. By way of example, the positional information can be sent by employing the SMS in the first embodiment. Besides, it can be sent by employing the IP packet in the second embodiment. Incidentally, the positional information may well be contained in the failure notice message.

The portable access terminal 108 refers to the positional information sent in, whereby it can navigate to the specified access point. In particular, radio access points are installed in various places, and the maintenance operation of any access point needs to be performed in company with a maintenance engineer who fully knows the installation place. In contrast, when the GPS function is utilized, even a maintenance engineer who does not know the installation place is permitted to go to the installation place of the access point alone. Incidentally, this modified embodiment is applicable to both the first and second embodiments described before.

The invention is applicable to industries concerning, for example, a radio communication system and the maintenance thereof.

What is claimed is:

1. An access point comprising:
a plurality of antennas for dividing a cover area into a plurality of sectors;
a radio portion which receives and/or transmits a radio signal through one of the antennas;
a signal processing portion which executes modulation, demodulation and calling-connection processing of the radio signal;
a line interface for connecting to a network;
a diagnostic test terminal portion which has a transmitter and a receiver of a radio access terminal, and which transmits the radio signal to said radio portion and receives the radio signal from said radio portion; and
a diagnosis control unit which controls said diagnostic test terminal portion to execute a predetermined diagnostic test of the access point thereof,
where the diagnostic test is performed by said diagnosis control unit by using said diagnostic test terminal portion and said radio portion;
wherein the access point further comprises:

a nondirectional antenna through which said diagnostic test terminal portion catches a radio wave from an adjacent access point located nearby;
a switch which connects said diagnostic test terminal portion to either of said nondirectional antenna and said radio portion; and
a memory which stores a transmission destination information for transmitting failure information which contains a failing part and/or a failure content and is obtained by the diagnostic test of said diagnosis control unit,
wherein
after executing the diagnostic test, in accordance with the failing part as a result of the diagnostic test, (1) said diagnostic test terminal portion and said radio portion are connected by said switch, and said diagnostic test terminal portion transmits the failure information to a predetermined radio access terminal by a first path through said radio portion, said signal processing portion and said line interface, or (2) said diagnostic test terminal portion and said nondirectional antenna are connected by said switch, the diagnostic test terminal portion catches the radio wave from the second access point, which is adjacent to own access point and is located nearby, through said nondirectional antenna, and said diagnostic test terminal portion transmits the failure information to the predetermined radio access terminal by a second path, which is through said nondirectional antenna and said adjacent access point located nearby, using radio wave between said nondirectional antenna and said adjacent access point located nearby,
wherein the first path or the second path in which any failure is not detected is used.

2. An access point comprising:
a plurality of antennas for dividing a cover area into a plurality of sectors;
a radio portion which receives and/or transmits a radio signal through one of the antennas;
a diagnostic test terminal portion which has a transmitter and a receiver of a radio access terminal, and which transmits the radio signal to said radio portion and receives the radio signal from said radio portion; and
a diagnosis control unit which controls said diagnostic test terminal portion to execute a predetermined diagnostic test of the first access point which is own access point,
the diagnostic test is performed by said diagnosis control unit by using said diagnostic test terminal portion and said radio portion,
wherein the access point further comprises:
a nondirectional antenna through which said diagnostic test terminal portion catches a radio wave from a second access point which is adjacent to town access point and is located nearby;
a switch which connects said diagnostic test terminal portion to either of said nondirectional antenna and said radio portion; and
a memory which stores a transmission destination information for transmitting failure information which contains a failing part and/or a failure content and is obtained by the diagnostic test of said diagnosis control unit,
wherein
after executing the diagnostic test, said diagnostic test terminal portion and said nondirectional antenna are connected by said switch,
the diagnostic test terminal portion catches the radio wave from the second access point, which is adjacent to own access point and is located nearby, through said nondirectional antenna, and
said diagnostic test terminal portion transmits identification information of own access point and the failure information of own access point to a predetermined radio access terminal, based on the transmission destination information stored in said memory, by a path through said nondirectional antenna and the second access point.

3. An access point according to claim 1, wherein:
said diagnosis control unit judges if the detected failing part exists in the first path; and
the failure information is transmitted to the predetermined radio access terminal by the second path in a case where the failing part exists in the first path.

4. An access point according to claim 1, wherein
one or plurality of the transmission destination information are stored in said memory; and
said diagnostic test terminal portion transmits the failure information to one or plurality of predetermined access terminals.

5. An access point according to claim 1, wherein said diagnostic test terminal portion transmits the failure information to the radio access terminal by using a short message service.

6. An access point according to claim 1, wherein
one or plurality of IP addresses of the radio access terminals for transmitting destination are stored in said memory, as the transmission destination information; and
said diagnostic test terminal portion transmits an IP packet containing the failure information, to an IP address which is assigned to the predetermined radio access terminal.

7. An access point according to claim 1, wherein the failure information further contains a degree of importance of the detected failure, and information for identifying the access point thereof.

8. An access point according to claim 1, wherein:
said radio portion includes a first radio portion which receives a radio signal component of first frequency, and a second radio portion which receives a radio signal component of second frequency;
said switch connects said diagnostic test terminal portion to said nondirectional antenna, said first radio portion or said second radio portion; and
a failureless path is selected from among paths through one of said nondirectional antenna, said first radio portion and said second radio portion, by said switch in accordance with the failing part detected by said diagnosis control unit, and the failure information is notified to the predetermined radio access terminal by the selected path.

9. An access point according to claim 1, wherein:
when said diagnostic test terminal portion and said nondirectional antenna are connected by said switch, said diagnostic test terminal portion:
catches radio waves which contain an identification code/identification codes for identifying the access point/access points, from one or a plurality of adjacent access points located nearby through said nondirectional antenna;

judges whether or not each identification code is a previously stored identification code of the access point thereof, by referring to each identification code of the caught radio wave;

selects a radio wave of predetermined communication quality from among the radio waves of the identification codes other than the identification code of the access point thereof; and transmits the failure information by the path through said nondirectional antenna and said adjacent access point located nearby, by using the selected radio wave.

10. An access point according to claim 2, wherein one or plurality of the transmission destination information are stored in said memory; and said diagnostic test terminal portion transmits the failure information to one or plurality of predetermined access terminals.

11. An access point according to claim 2, wherein said diagnostic test terminal portion transmits the failure information to the radio access terminal by using a short message service.

12. An access point according to claim 2, wherein one or plurality of IP addresses of the radio access terminals for transmitting destination are stored in said memory, as the transmission destination information; and said diagnostic test terminal portion transmits an IP packet containing the failure information, to an IP address which is assigned to the predetermined radio access terminal.

13. An access point according to claim 2, wherein the failure information further contains a degree of importance of the detected failure, and information for identifying the access point thereof.

14. An access point according to claim 2, wherein:

said radio portion includes a first radio portion which receives a radio signal component of first frequency, and a second radio portion which receives a radio signal component of second frequency;

said switch connects said diagnostic test terminal portion to said nondirectional antenna, said first radio portion or said second radio portion; and a failureless path is selected from among paths through one of said nondirectional antenna, said first radio portion and said second radio portion, by said switch in accordance with the failing part detected by said diagnosis control unit, and the failure information is notified to the predetermined radio access terminal by the selected path.

15. An access point according to claim 2, wherein:

when said diagnostic test terminal portion and said nondirectional antenna are connected by said switch, said diagnostic test terminal portion:

catches radio waves which contain an identification code/identification codes for identifying the access point/access points, from one or plurality of adjacent access points located nearby through said nondirectional antenna;

judges whether or not each identification code is a previously stored identification code of the access point thereof, by referring to each identification code of the caught radio wave;

selects a radio wave of predetermined communication quality from among the radio waves of the identification codes other than the identification code of the access point thereof; and transmits the failure information by the path through said nondirectional antenna and said adjacent access point located nearby, by using the selected radio wave.

16. An access point comprising:

a plurality of antennas for dividing a cover area into a plurality of sectors;

a radio portion which receives and/or transmits a radio signal through one of the antennas;

a signal processing portion which executes modulation, demodulation and calling-connection processing of the radio signal;

a line interface for connecting to a network;

a diagnostic test terminal portion which has a transmitter and a receiver of a radio access terminal, and which transmits the radio signal to said radio portion and receives the radio signal from said radio portion; and a diagnosis control unit which controls said diagnostic test terminal portion to execute a predetermined diagnostic test of the access point thereof, where the diagnostic test is performed by said diagnosis control unit by using said diagnostic test terminal portion and said radio portion;

wherein the access point further comprises:

a nondirectional antenna through which said diagnostic test terminal portion catches a radio wave from an adjacent access point;

a switch which connects said diagnostic test terminal portion to either of said nondirectional antenna and said radio portion; and a memory which stores a transmission destination information for transmitting failure information which contains a failing part and/or a failure content and is obtained by the diagnostic test of said diagnosis control unit, wherein after executing the diagnostic test, in accordance with the failing part as a result of the diagnostic test, (1) said diagnostic test terminal portion and said radio portion are connected by said switch, and said diagnostic test terminal portion transmits the failure information to a predetermined radio access terminal by a first path through said radio portion, said signal processing portion and said line interface, or (2) said diagnostic test terminal portion and said nondirectional antenna are connected by said switch, the diagnostic test terminal portion catches the radio wave from the second access point, which is adjacent to own access point and is located nearby, through said nondirectional antenna, and said diagnostic test terminal portion transmits the failure information to the predetermined radio access terminal by a second path, which is through said second nondirectional antenna and said adjacent access point, using radio wave between said nondirectional antenna and said adjacent access point, wherein the first path or the second path in which any failure is not detected is used.

* * * * *